United States Patent
Cheng

(10) Patent No.: US 7,612,995 B2
(45) Date of Patent: Nov. 3, 2009

(54) SHOCKPROOF LOCKING ASSEMBLY DEVICE

(75) Inventor: Chun-Yi Cheng, Taipei (TW)

(73) Assignee: ASUSTek Computer Inc., Peitou, Taipei (TW)

( * ) Notice: Subject to any disclaimer, the term of this patent is extended or adjusted under 35 U.S.C. 154(b) by 415 days.

(21) Appl. No.: 11/358,405

(22) Filed: Feb. 22, 2006

(65) Prior Publication Data

US 2006/0202100 A1    Sep. 14, 2006

(30) Foreign Application Priority Data

Feb. 23, 2005  (TW) .............................. 94105495 A

(51) Int. Cl.
  *G06F 1/16*  (2006.01)
  *H05K 5/00*  (2006.01)
  *H05K 7/00*  (2006.01)
(52) U.S. Cl. ............................ 361/679.36; 361/679.34
(58) Field of Classification Search ................ 361/683, 361/685, 679.33–679.36; 411/372.5, 373, 411/482, 542
See application file for complete search history.

(56) References Cited

U.S. PATENT DOCUMENTS

| | | | | |
|---|---|---|---|---|
| 4,129,060 A * | 12/1978 | Gould | ...................... | 411/372.5 |
| 4,683,520 A * | 7/1987 | Grassens et al. | ............ | 361/825 |
| 4,713,714 A * | 12/1987 | Gatti et al. | ................... | 360/137 |
| 4,781,508 A * | 11/1988 | Schroeder et al. | ........... | 411/452 |
| 5,035,396 A * | 7/1991 | Krum et al. | .................. | 248/635 |
| 5,131,619 A * | 7/1992 | Daugherty et al. | .......... | 248/635 |
| 5,187,643 A * | 2/1993 | I-Shou | ....................... | 361/685 |
| 5,452,179 A * | 9/1995 | Sasaki | ......................... | 361/685 |
| 5,668,791 A * | 9/1997 | Yamada et al. | .............. | 720/693 |
| 5,746,039 A * | 5/1998 | Nystrom | ....................... | 52/639 |
| 6,022,177 A * | 2/2000 | Hofer | ......................... | 411/412 |
| 6,249,504 B1 * | 6/2001 | Iwanaga | ..................... | 720/692 |
| 6,313,984 B1 * | 11/2001 | Furay | ......................... | 361/685 |
| 6,762,932 B2 * | 7/2004 | Regimbal et al. | ........... | 361/683 |
| 7,118,303 B2 * | 10/2006 | Doubler et al. | ............. | 403/362 |

* cited by examiner

*Primary Examiner*—Jayprakash N Gandhi
*Assistant Examiner*—Quinn Hunter

(57) ABSTRACT

A shockproof locking assembly device includes a locking hole member, a cavity member, a locking element and a vibration-absorbing element. The cavity member has a bottom portion with a through hole with a recess. The locking element includes a head portion, a shaft portion and a link portion. The head portion is disposed inside the cavity member. The shaft portion penetrates the through hole to be locked into the locking hole member, so that the head portion and the shaft portion are respectively positioned on the top side and the down side of the bottom portion. The link portion has a protrusion with a taper level. The vibration-absorbing element penetrates the through hole, encompasses the link portion and clamps the bottom portion. The shaft portion penetrates through the vibration-absorbing element and the protrusion is locked with the recess via part of the vibration-absorbing element.

19 Claims, 2 Drawing Sheets

SHOCKPROOF LOCKING ASSEMBLY DEVICE

This application claims the benefit of Taiwan application Serial No. 94105495, filed Feb. 23, 2005, the subject matter of which is incorporated herein by reference.

BACKGROUND OF THE INVENTION

1. Field of the Invention

The invention relates in general to a shockproof locking assembly device, and more particularly to a shockproof locking assembly device.

2. Description of the Related Art

With the rapid advance in science and technology, notebook computer has become an indispensable part to modern people in their everyday life. Notebook computer includes at least a host and a monitor and the folding of the monitor and host are through a hinge. The monitor can rotate with respect to the host via the hinge. The host includes at least a computer housing, a motherboard, a CPU, a memory, a display card, a hard disc, a keyboard and a touch-control pad. The motherboard, the CPU, the memory, the display card and the hard disc are disposed in the computer housing. The keyboard and the touch-control pad are disposed on the top surface of the host and face the monitor. The CPU, the memory, the display card, the hard disc, the press key and the touch-control pad are coupled to the motherboard via the cable or the electrical slot of the motherboard. The monitor is electrically connected to the motherboard inside the host via the hinge by a soft cable. As for how the hard disc is disposed inside the host is elaborated below.

The conventional computer housing has an accommodation space disposed on the rear of the host. The user can place the hard disc in the accommodation space. The connector of the hard disc is electrically connected to the connector of the motherboard via hot plug. After the hard disc is electrically connected to the motherboard, the user can lock a cover with the computer housing to cover up the accommodation space and the hard disc.

However, when the notebook computer is hit be an external force or the user drop the notebook computer off to the ground by accident, since the hard disc is electrically connected to the connector of the motherboard via a connector to be disposed inside the notebook computer, the firmness and vibration protection of the hard disc is rather poor. It is possible that the data stored in the hard disc might be damaged due to the vibration or collision of the hard disc, thus the completeness of data stored in the hard disc can not be maintained.

SUMMARY OF THE INVENTION

It is therefore the object of the invention to provide a shockproof locking assembly device. The design of incorporating the cavity member, the locking hole member, the locking element and the vibration-absorbing element not only enables the first housing having a locking hole member to be assembled with the second housing having a cavity member, but also prevents the first housing and the second housing from vibrating when receiving an external force, largely enhancing the connection quality between the first housing and the second housing and their shockproof strength as well. Besides, when the locking hole member and the cavity member are respectively disposed in the hard disc cover and the cover of notebook computer, the hard disc is prevented from vibrating when the notebook computer receives an external force or falls to the ground, lest the data stored in the hard disc might be damaged when the hard disc vibrates or receives an external force. Therefore, the completeness of the data stored in the hard disc is maintained.

According to an object of the invention, a shockproof locking assembly device including a locking hole member, a cavity member, a locking element and a vibration-absorbing element is provided. The cavity member has a bottom portion, the bottom portion has a through hole, and the wall of the through hole has a recess. The locking element includes a head portion, a shaft portion and a link portion. The link portion is for connecting the head portion and the shaft portion. The head portion is disposed inside the cavity member. The shaft portion penetrates the through hole to be locked into the locking hole member, so that the head portion and the shaft portion are respectively positioned on the top side and the down side of the bottom portion. The lateral surface of the link portion has a protrusion corresponding to the recess. The protrusion has a taper level. The vibration-absorbing element penetrates the through hole, encompasses the link portion and clamps the bottom portion. The shaft portion penetrates through the vibration-absorbing element, and the protrusion is locked with the recess via part of the vibration-absorbing element.

According to another object of the invention, a notebook computer including a computer housing, a cover, a hard disc and a shockproof locking assembly device is provided. The computer housing has an accommodation space. The cover can be bucked with the computer housing to cover up the accommodation space. The hard disc is disposed in the accommodation space and has a hard disc housing. The shockproof locking assembly device is disposed between the cover and the hard disc for assembling the cover and the hard disc. The shockproof locking assembly device includes a locking hole member, a cavity member, a locking element and a vibration-absorbing element. The cavity member has a bottom portion. The bottom portion has a through hole. The wall of the through hole has a recess. The locking element includes a head portion, a shaft portion and a link portion. The link portion is for connecting the head portion and the shaft portion. The head portion is disposed inside the cavity member. The shaft portion penetrates the through hole to be locked into the locking hole member, so that the head portion and the shaft portion are respectively positioned on the top side and the down side of the bottom portion. The lateral surface of the link portion has a protrusion corresponding to the recess. The protrusion has a taper level. The vibration-absorbing element penetrates the through hole, encompasses the link portion and clamps the bottom portion. The shaft portion penetrates through the vibration-absorbing element, and the protrusion is locked with the recess via part of the vibration-absorbing element.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides a shockproof locking assembly device including a locking hole member, a cavity member, a locking element and a vibration-absorbing element. The cavity member has a bottom portion, the bottom portion has a through hole, and the wall of the through hole has a recess. The locking element includes a head portion, a shaft portion and a link portion. The link portion is for connecting the head portion and the shaft portion. The head portion is disposed inside the cavity member. The shaft portion penetrates the through hole to be locked into the locking hole member. The head portion and the shaft portion are respectively positioned on the top side and the down side of the bottom portion. The lateral surface of the link portion has a protrusion corresponding to the recess. The protrusion has a taper level. The vibration-absorbing element penetrates the through hole, encompasses the link portion and clamps the bottom-portion. The shaft portion penetrates through the vibration-absorbing element, and the protrusion is locked with the recess via part of the vibration-absorbing element. As for the practical application of the shockproof locking assembly device of the invention is exemplified by a first embodiment and a second embodiment.

First Embodiment

Figure 1:
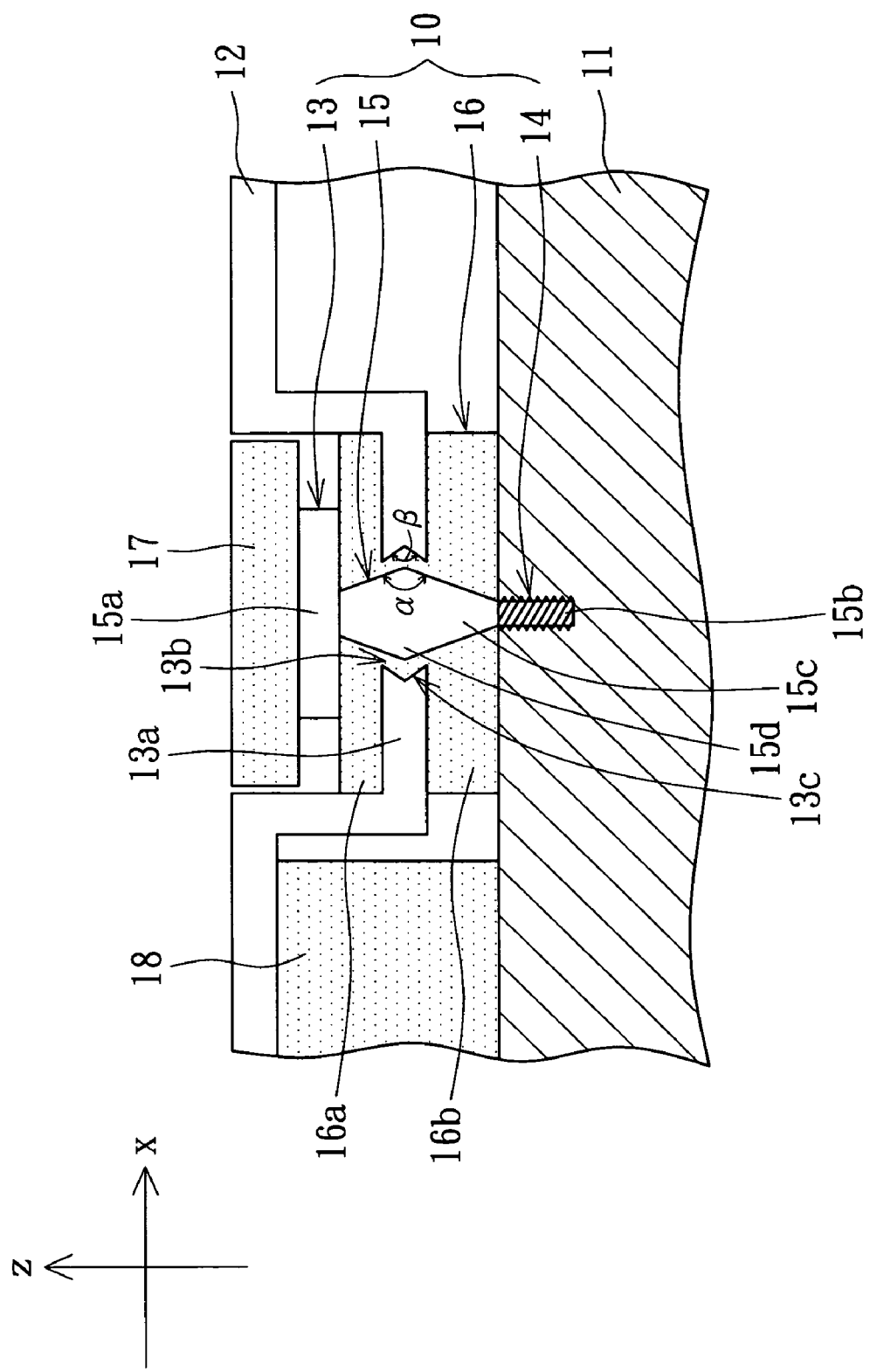
FIG. 1 is a cross-sectional view of a shockproof locking assembly device according to a first embodiment of the invention.

Referring to FIG. 1, a cross-sectional view of a shockproof locking assembly device according to a first embodiment of the invention is shown. In FIG. 1, the shockproof locking assembly device 10 is disposed between a first housing 11 and a second housing 12. The shockproof locking assembly device 10 is for connecting the first housing 11 and a second housing 12. The shockproof locking assembly device 10 is for preventing the first housing 11 and the second housing 12 from vibrating when the first housing 11 or the second housing 12 receives an external force. The shockproof locking assembly device 10 includes a locking hole member 14, a cavity member 13, a locking element 15 and a vibration-absorbing element 16. The cavity member 13 has a bottom portion 13a. The bottom portion 13a has a through hole 13b. The wall of the through hole 13b has a recess 13c. The cavity member 13 is like a cavity member of a sunk fish eye.

The locking element 15 includes a head portion 15a, a shaft portion 15b and a link portion 15c. The link portion 15c is for connecting the head portion 15a and the shaft portion 15b. The head portion 15a is disposed inside the cavity member 13. The shaft portion 15b penetrates the through hole 13b to be locked into the locking hole member 14, so that the head portion 15a and the shaft portion 15b are respectively positioned on the top side and the down side of the bottom portion 13a. The lateral surface of the link portion 15c has a protrusion 15d corresponding to the recess 13c. The protrusion 15d has a taper level. The link portion 15c extends towards the shaft portion 15b from the head portion 15a to connect the head portion 15a and the shaft portion 15b. The inner diameter of the link portion 15c along the x direction grows larger first and then shrinks gradually, so that the protrusion 15d disposed on the lateral surface of the link portion 15c have the above taper level. Besides, the head portion 15a, the shaft portion 15b and the link portion 15c can be a one-piece molding structure, and the taper level of the protrusion 15d can be Morse taper level, Brown & Sharpe taper level, milling machine standard taper level or Jarno taper level.

The vibration-absorbing element 16 penetrates the through hole 13b, encompasses the link portion 15c and clamps the bottom portion 13a. The shaft portion 15b penetrates through the vibration-absorbing element 16, and the protrusion 15d is coupled with the recess 13c via part of the vibration-absorbing element 16. The vibration-absorbing element 16 can be an I-shaped hollowed shrink-ring.

When the first housing 11 or the second housing 12 receives an external force, due to the design that the vibration-absorbing element 16 tightly contacts the first housing 11 and the second housing 12, the vibration-absorbing element 16 can absorb the external force received by the first housing 11 or the second housing 12 to prevent the first housing 11 and the second housing 12 from vibrating, thereby enhancing the shockproof strength between the first housing 11 and the second housing 12.

However, anyone who is skilled in the technology of the present embodiment will understand that the technology of the present embodiment of the invention is not limited thereto. For example, in FIG. 1, the protrusion 15d and the recess 13c respectively are a peak and a valley. The angle α contained at the apex of the peak is larger than or equal to the angle β contained at the bottom of the valley, so that the strength of the connection between the protrusion 15d and the recess 13d via part of the vibration-absorbing element 16 is enhanced. Besides, as shown in FIG. 1, the vibration-absorbing element 16 further includes a first rib portion 16a and a second rib portion 16b. The first rib portion 16a and the second rib portion 16b respectively encompass the outside lateral surface of the top portion and the bottom portion of the vibration-absorbing element 16. The first rib portion 16a and the second rib portion 16b are respectively positioned on the top side and the down side of the bottom portion 13a. The first rib portion 16a and the second rib portion 16b are for clamping the bottom portion 13a. Besides, a vibration-isolating element 17 can be disposed on the head portion 15a. The vibration-isolating element 17 can be positioned inside the cavity member 13. Moreover, as shown in FIG. 1, since the second housing 12 and the bottom portion 13a are interspaced by a distance, a vibration-isolating element 18 can be disposed between the second housing 12 and the first housing 11. The shaft portion 15b and the locking hole member 14 respectively are a screw rod and a screw hole. The vibration-absorbing element 16, and the vibration-isolating elements 17 and 18 can be an elastomer made of elastic materials such as rubber, plastics or polymer.

According to the present embodiment, the locking hole member 14 can be disposed in a hard disc housing of a hard disc. That is, the first housing 11 can be a hard disc housing. The cavity member 13 can be disposed in a carrier. That is, the second housing 12 can be a carrier. The carrier can be disposed on a motherboard of a notebook computer, so that hard disc can be disposed on the motherboard via the carrier. Thus, the notebook computer is prevented from vibrating when receiving an external force or falling to the ground, lest the data stored in the hard disc might be damaged when the hard disc vibrates or receives an external force, thus maintaining the completeness of the data stored in the hard disc.

Second Embodiment

Figure 2:
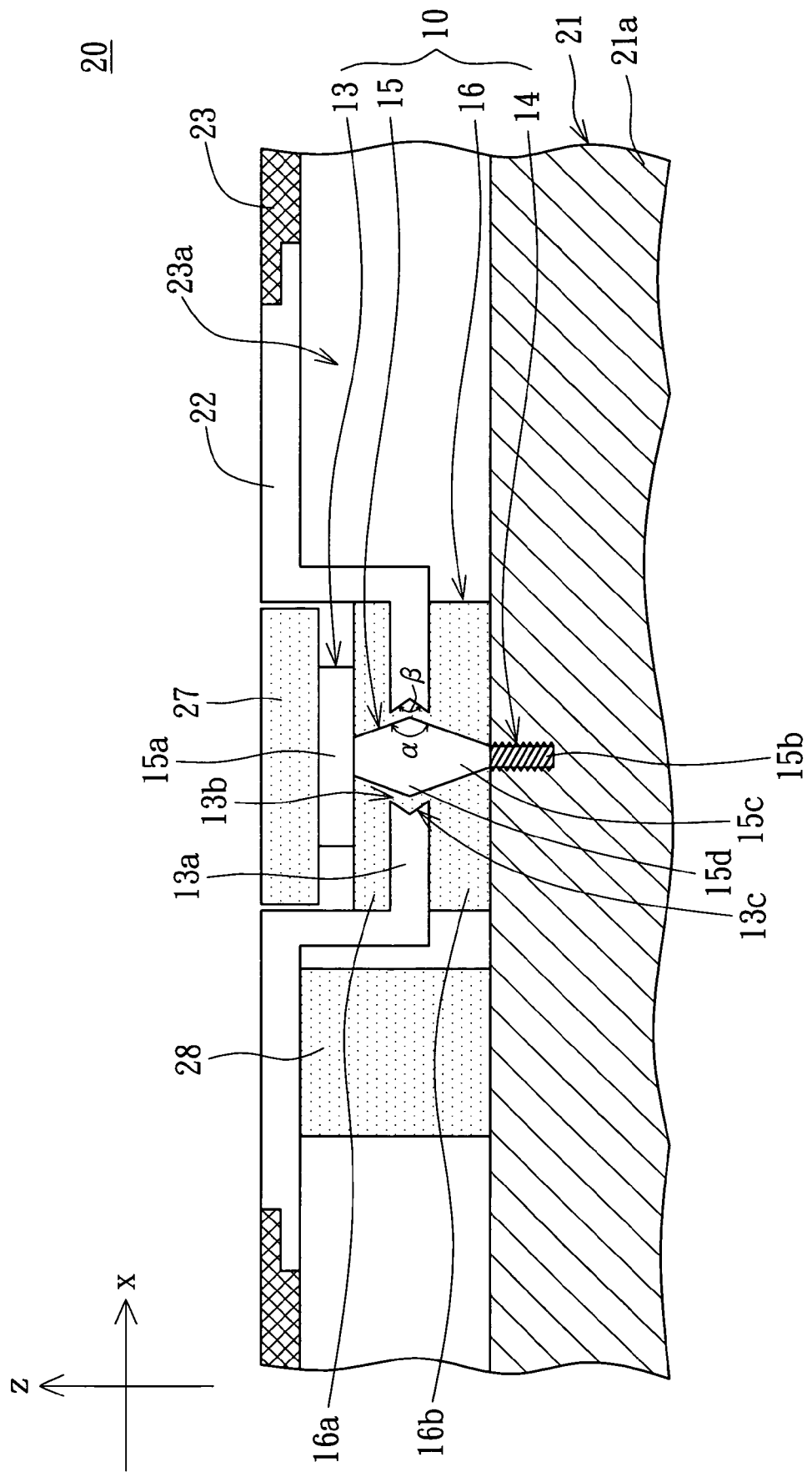
FIG. 2 is a cross-sectional view of a notebook computer using a shockproof locking assembly device according to a second embodiment of the invention.

Referring to FIG. 2, a cross-sectional view of a notebook computer using a shockproof locking assembly device according to a second embodiment of the invention. In FIG. 2, the notebook computer 20 includes a computer housing 23, a cover 22, a hard disc 21 and a shockproof locking assembly device 10. The computer housing 23 has an accommodation space 23a. The cover 22 can be buckled with the computer housing 23 to cover up the accommodation space 23a. The hard disc 21 is disposed in the accommodation space 23a and is electrically connected to the motherboard of notebook computer 20. The hard disc 21 has a hard disc housing 21a. The shockproof locking assembly device 10 is disposed between the cover 22 and the hard disc housing 21a. The shockproof locking assembly device 10 is for connecting the cover 22 and the hard disc housing 21a. The shockproof locking assembly device 10 has already been elaborated in the first embodiment, as for the same components, the same labels are used and are not repeated here. The cavity member 13 is disposed in the cover 22, and the locking hole member 14 is disposed in the hard disc housing 21a.

When the notebook computer 20 receives an external force or falls to the ground, due to the design that the vibration-absorbing element 16 tightly contacts the hard disc housing 21a and the cover 22 and that the cover 22 is buckled with the computer housing 23, the vibration-absorbing element 16 can absorb the external force received by notebook computer 20 to prevent the notebook computer from vibrating, thereby enhancing the shockproof strength of the hard disc housing 21a and the upper cover. Moreover, the design prevents the hard disc 21 from vibrating, so that the data stored in the hard disc 21 will not be damaged due to the vibration or collision of the hard disc, thereby maintaining the completeness of the data stored in the hard disc 21.

However, anyone who is skilled in the technology of the present embodiment of the invention will understand that the technology of the present embodiment of the invention is not limited thereto. For example, a vibration-isolating element 27 can further be disposed on the head portion 15a. The vibration-isolating element 27 can be positioned inside the cavity member 13. Besides, as shown in FIG. 2, since the cover 22 and the bottom portion 13a are interspaced by a distance, a vibration-isolating element 28 can be disposed between the cover 22 and the hard disc housing 21a. The vibration-isolating elements 27 and 28 can be an elastomer made of elastic materials such as rubber, plastics or polymer.

The shockproof locking assembly device disclosed in above embodiments of the invention, with the design of incorporating the cavity member, the locking hole member, the locking element and the vibration-absorbing element, not only enables the first housing having a locking hole member to be assembled with the second housing having a cavity member, but also prevents the first housing and the second housing from vibrating when receiving an external force. The vibration-isolating element provides a vertical buffer space, while the vibration-absorbing element provides a buffer function at the positioning point, largely enhancing the connection quality between the first housing and the second housing and their shockproof strength as well. Besides, when the locking hole member and the cavity member respectively disposed in the hard disc cover and the cover of notebook computer, the hard disc is prevented from vibrating when the notebook computer receives an external force or falls to the ground, lest the data stored in the hard disc might be damaged when the hard disc vibrates or receives an external force, thus maintaining the completeness of the data stored in the hard disc. Moreover, the design of the taper level and the cavity member provides enhanced coupling effect. According to the invention, the impact caused when the screw is directly screwed into the hard disc.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A shockproof locking assembly device, comprising:
   a locking hole member;
   a cavity member having a bottom portion, wherein the bottom portion has a through hole, and the wall of the through hole has a recess;
   a locking element, comprising:
      a head portion and a shaft portion, wherein the head portion is disposed inside the cavity member, and the shaft portion penetrates the through hole to be locked into the locking hole member, so that the head portion and the shaft portion are respectively positioned on the top side and the down side of the bottom portion; and
      a link portion for connecting the head portion and the shaft portion, wherein the lateral surface of the link portion has a protrusion corresponding to the recess, and the protrusion has a taper level; and
   a vibration-absorbing element, which penetrates the through hole, encompasses the link portion and clamps the bottom portion, wherein the shaft portion penetrates through the vibration-absorbing element, and the protrusion is located at a position facing the recess such that the protrusion is locked with the recess via part of the vibration-absorbing element.

2. The shockproof locking assembly device according to claim 1, wherein a vibration-isolating element can be disposed on the head portion, and the vibration-isolating element can be positioned inside the cavity member.

3. The shockproof locking assembly device according to claim 1, wherein the taper level is Morse taper level, Brown & Sharpe taper level, milling machine standard taper level or Jarno taper level.

4. The shockproof locking assembly device according to claim 1, wherein the protrusion and the recess respectively are a peak and a valley, the angle contained at the apex of the peak is larger than or equal to the angle contained at the bottom of the valley.

5. The shockproof locking assembly device according to claim 1, wherein the vibration-absorbing element is an I-shaped hollowed shrink-ring.

6. The shockproof locking assembly device according to claim 1, wherein the vibration-absorbing element further comprises:
   a first rib portion and a second rib portion, which respectively encompass the outside lateral surface of the top portion and the bottom portion of the vibration-absorbing element, wherein the first rib portion and the second rib portion are positioned on the top side and the down side of the bottom portion, the first rib portion and the second rib portion are for clamping the bottom portion.

7. The shockproof locking assembly device according to claim 6, wherein the locking hole member is disposed in a first housing, and the second rib portion is positioned between the bottom portion and the first housing.

8. The shockproof locking assembly device according to claim 7, wherein the cavity member is disposed in a second housing, the second housing and the bottom portion are interspaced by a distance, and a vibration-isolating element can be disposed between the second housing and the first housing.

9. The shockproof locking assembly device according to claim 8, wherein the locking hole member is disposed in a hard disc housing, the cavity member is disposed in a cover of a notebook computer, the notebook computer further has a computer housing, the computer housing has an accommodation space, the hard disc is disposed in the accommodation space, the cover is able to be buckled with the computer housing to cover up the accommodation space.

10. The shockproof locking assembly device according to claim 9, wherein a vibration-isolating element can be disposed between the cover and the hard disc housing.

11. The shockproof locking assembly device according to claim 1, wherein the locking hole member is disposed in a hard disc housing, the cavity member is disposed in a carrier, the carrier can be disposed on a motherboard of a notebook computer, so that the hard disc is disposed on the motherboard via the carrier.

12. The shockproof locking assembly device according to claim 11, wherein a vibration-isolating element can be disposed between the carrier and the hard disc housing.

13. A notebook computer, comprising:
   a computer housing having an accommodation space;
   a cover buckled with the computer housing to cover up the accommodation space;
   a hard disc having a hard disc housing disposed in the accommodation space; and
   a shockproof locking assembly device disposed between the cover and the hard disc for assembling the cover and the hard disc, wherein the shockproof locking assembly device comprises:
      a locking hole member disposed in the hard disc housing;
      a cavity member disposed in the cover and having a bottom portion, wherein the bottom portion has a through hole, and the wall of the through hole has a recess;
      a locking element, comprising:
      a head portion and a shaft portion, wherein the head portion is disposed inside the cavity member, the shaft portion penetrates the through hole to be locked into the locking hole member, so that the head portion and the shaft portion are respectively positioned on the top side and the down side of the bottom portion; and
      a link portion for connecting the head portion and the shaft portion, wherein the lateral surface of the link portion has a protrusion corresponding to the recess, and the protrusion has a taper level; and
      a vibration-absorbing element, which penetrates the through hole, encompasses the link portion and clamps the bottom portion, wherein the shaft portion penetrates through the vibration-absorbing element, and the protrusion is located at a position facing the recess such that the protrusion is locked with the recess via part of the vibration-absorbing element.

14. The notebook computer according to claim 13, wherein a vibration-isolating element can further be disposed on the head portion, the vibration-isolating element can be positioned inside the cavity member.

15. The notebook computer according to claim 13, wherein the taper level is Morse taper level, Brown & Sharpe taper level, milling machine standard taper level or Jarno taper level.

16. The notebook computer according to claim 13, wherein the protrusion and the recess respectively are a peak and a valley, the angle contained at the apex of the peak is larger than or equal to the angle contained at the bottom of the valley.

17. The notebook computer according to claim 13, wherein the vibration-absorbing element is an I-shaped hollowed shrink-ring.

18. The notebook computer according to claim 13, wherein the vibration-absorbing element further comprises:
   a first rib portion and a second rib portion, which respectively encompass the outside lateral surface of the top portion and the bottom portion of the vibration-absorbing element, wherein the first rib portion and the second rib portion are positioned on the top side and the down side of the bottom portion, the first rib portion and the second rib portion are for clamping the bottom portion.

19. The notebook computer according to claim 13, wherein a vibration-isolating element can be disposed between the cover and the hard disc housing.

* * * * *